(12) United States Patent
Harris et al.

(10) Patent No.: US 11,468,381 B1
(45) Date of Patent: Oct. 11, 2022

(54) SYSTEM AND METHOD FOR VIRTUAL CLOUD-BASED FACILITATION OF HOMELESSNESS REDUCTION THROUGH SECURE, SCALABLE, REAL-TIME NEED ASSESSMENT AND RESOURCE AVAILABILITY TRACKING AND ALLOCATION

(71) Applicant: Sallen LLC, Seattle, WA (US)

(72) Inventors: Samuel G. Harris, Seattle, WA (US); Peter Joseph Sliva, Seattle, WA (US)

(73) Assignee: SALLEN LLC, Seattle, WA (US)

( * ) Notice: Subject to any disclaimer, the term of this patent is extended or adjusted under 35 U.S.C. 154(b) by 0 days.

(21) Appl. No.: 17/110,136

(22) Filed: Dec. 2, 2020

Related U.S. Application Data

(60) Provisional application No. 62/942,633, filed on Dec. 2, 2019.

(51) Int. Cl.
*G06Q 10/06* (2012.01)
*H04L 67/142* (2022.01)
*G06F 16/9035* (2019.01)

(52) U.S. Cl.
CPC ... *G06Q 10/06315* (2013.01); *G06F 16/9035* (2019.01); *G06Q 10/0635* (2013.01); *H04L 67/142* (2013.01)

(58) Field of Classification Search
CPC .......... G06Q 10/06315; G06Q 10/0635; G06F 16/9035; H04L 67/142
See application file for complete search history.

(56) References Cited

U.S. PATENT DOCUMENTS 10,817,831 B1 * 10/2020 Polyanskiy ............ G06Q 10/02
2009/0172039 A1 * 7/2009 Honami ................ G06F 16/128
(Continued)

FOREIGN PATENT DOCUMENTS

WO    WO-2015157570 A1 * 10/2015 ............. G16H 70/00

OTHER PUBLICATIONS

Bennett, Susan D. "No Relief but upon the Terms of Coming into the House—Controlled Spaces, Invisible Disentitlements, and Homelessness in an Urban Shelter System." Yale LJ 104 (1994): 2157. (Year: 1994).*

(Continued)

*Primary Examiner* — Patricia H Munson
*Assistant Examiner* — Hamzeh Obaid
(74) *Attorney, Agent, or Firm* — Leonid Kisselev

(57) ABSTRACT

Homelessness and the burden that homelessness places on public health infrastructure can be reduced via a virtual cloud-based system and method that maintain an up-to-date availability of available resources, provide a way for a person-at-need, such as a homeless or a person at risk of homelessness, to gain access to those resources online or through dial-in, and provide advice to the person if the advice is necessary for connecting to the necessary resources. A virtual cloud-computing environment provides a scalable and secure environment where providers of resources can submit information about resources they are willing to contribute. An individual-at-need can access the system online and resources appropriate for that person are determined. Resource officers can access the system from any place that has Internet access and use the system as a tool to allocate resources to an individual in a social crisis that can lead or perpetuate homelessness.

19 Claims, 5 Drawing Sheets

(56) References Cited

U.S. PATENT DOCUMENTS

| | | | | |
|---|---|---|---|---|
| 2011/0209195 | A1* | 8/2011 | Kennedy | H04L 63/102 726/1 |
| 2013/0066988 | A1* | 3/2013 | Levinson | G06Q 10/107 709/206 |
| 2017/0116560 | A1* | 4/2017 | Wickstrom | H04L 9/3247 |
| 2017/0272316 | A1* | 9/2017 | Johnson | G06Q 10/103 |
| 2017/0272361 | A1* | 9/2017 | Speight | H04W 4/80 |
| 2018/0097838 | A1* | 4/2018 | Stolarz | G06N 3/084 |
| 2019/0294676 | A1* | 9/2019 | Sapugay | G10L 15/22 |
| 2020/0372596 | A1* | 11/2020 | Cheung | G06Q 50/2053 |
| 2020/0394199 | A1* | 12/2020 | Haldar | G06F 16/9535 |

OTHER PUBLICATIONS

Hajjdiab, Hassan, et al. "A Food Wastage Reduction Mobile Application." 2018 6th International Conference on Future Internet of Things and Cloud Workshops (FiCloudW). IEEE, 2018. (Year: 2018).*

Shoujanya, Rehnuma, Christy Bernadatte Gonsalves, and Mashrufa Harun. An automated system for disaster management based on BRAC standard operating procedures (SOP). Diss. BRAC University, 2014. (Year: 2014).*

Ansari, Mukhtar, et al. "Android application for employing skilled and unskilled people." (2019). (Year: 2019).*

El Gayar, Neamat Farouk, et al. "An integrated framework for advanced hotel revenue management." International Journal of Contemporary Hospitality Management (2011). (Year: 2011).* https://www.hudexchange.info/resource/1975/criteria-for-definition-of-at-risk-of-homelessness/ (Year: 2012).*

Crook, Wendy P., et al. "Outcome measurement in homeless systems of care." Evaluation and Program Planning 28.4 (2005): 379-390. (Year: 2005).*

Cao, Diana. "Regulation through deregulation: sharing economy companies gaining legitimacy by circumventing traditional frameworks." Hastings LJ 68 (2016): 1085. (Year: 2016).*

Carvalho, Luís Augusto Pipa. Supporting homeless people with IVR systems. Diss. 2018. (Year: 2018).*

Le Dantec, Christopher A., et al. "Publics in practice: Ubiquitous computing at a shelter for homeless mothers." Proceedings of the SIGCHI Conference on Human Factors in Computing Systems. 2011. (Year: 2011).*

Greeson, Johanna KP, et al. "Youth Matters: Philly (YMP): Development, usability, usefulness, & accessibility of a mobile web-based app for homeless and unstably housed youth." Children and Youth Services Review 108 (2019): 104586. (Year: 2019).*

Figueira, Silvia, et al. "Youth StreetConnect—Helping homeless young women." IEEE Global Humanitarian Technology Conference (GHTC 2014). IEEE, 2014. (Year: 2014).*

Sheoran, Bhupendra, et al. "YTH StreetConnect: Development and usability of a mobile app for homeless and unstably housed youth." JMIR mHealth and uHealth 4.3 (2016): e82. (Year: 2016).* https://en.wikipedia.org/w/index.php?title=Homeless_Management_Information_Systems&oldid=919396917 , revised on Oct. 3, 2019.

"2019 Coordinated Entry System Racial Equity Analysis of Assessment Data", Wilkey et al, prepared by C4 Innovations of Needham, Massachusetts, for Building Changes in Seattle, Washington, Oct. 2019, retrieved from https://c4innovates.com/wp-content/uploads/2019/10/CES_Racial_Equity-Analysis_Oct112019.pdf.

* cited by examiner

50

80

SYSTEM AND METHOD FOR VIRTUAL CLOUD-BASED FACILITATION OF HOMELESSNESS REDUCTION THROUGH SECURE, SCALABLE, REAL-TIME NEED ASSESSMENT AND RESOURCE AVAILABILITY TRACKING AND ALLOCATION

CROSS-REFERENCE TO RELATED APPLICATION

This non-provisional patent application claims priority under 35 U.S.C. § 119(e) to U.S. Provisional patent application, Ser. No. 62/942,633, filed Dec. 2, 2019, the disclosure of which is incorporated by reference.

FIELD

This application relates in general to public health technology, and, in particular, to a system and method for virtual cloud-based facilitation of homelessness reduction through secure, scalable, real-time need assessment and resource availability tracking and allocation.

BACKGROUND

According to the Department of Housing and Urban Development, the number of homeless individuals across the United States has reached in 2018 about 553,000 people. The number of homeless people has been rising in major urban areas especially rapidly in recent years. For instance, during the six years preceding 2018, Los Angeles has been reported to experience a 75% rise in homelessness. While the exact nature and extent of factors driving people to homelessness are still debated, the deleterious impact of homelessness on both the homeless individuals and urban society and infrastructure as a whole are evident. In particular, homeless individuals are generally in a greater danger of violent assault than the general population and are also often exposed to environmental conditions that can exacerbate preexisting physical and mental illnesses as well as substance addictions. Further, homeless individuals generally do not receive adequate primary medical care. When homeless individuals are treated by medical organizations, such as hospitals, the individuals are often in an emergency condition, such as experiencing an acute episode of a physical or mental illness, a drug overdose or addiction, or a result of a physical assault. As the number of homeless people who need such emergency care rises, the capacity of medical organizations to provide the care becomes strained and may not always be able to adequately provide the required care to both the homeless individuals and the general populations. In addition, as homeless individuals often live in unsanitary conditions, such as in unsanctioned homeless encampments, infectious diseases that are spread by rodents have been thought uncommon in the United States can flare up, threatening both the homeless and the non-homeless populations in the area.

For instance, Los Angeles has already experienced an outbreak of typhus among the homeless population in 2018. Even in the absence of rodents, poor sanitation can lead to outbreaks of other infection diseases; for instance, in 2017, California has experienced an outbreak of Hepatitis A among the homeless population with multiple fatalities. If such outbreaks do become widespread, public health organizations may become overwhelmed and unable to deal with the spread of the diseases.

Further, the dangers of infectious disease outbreak among homeless individuals has increased by many magnitudes in 2020, with the outbreak of Covid-19. While the exact means of transmission of Covid-19 are still being studied, the virus is highly contagious and has led to an estimated over 260,000 deaths alone in U.S. alone by Nov. 23, 2020. While most public health strategies for combatting Covid-19 spread have relied on limiting contact between individuals in the populations, and when possible, self-isolation, people in the homeless population do not have the same opportunities for self-isolation and thus are more vulnerable to Covid-19. In addition, even before the Covid-19 pandemic, 80% of American workers were living paycheck to paycheck and 60% were unable to afford a $600 emergency according to US Government as of January 2020. With the coming of Covid-19 related shutdowns, job losses, and general economic decline, the danger of someone becoming homeless has increased many times.

Despite the enormous public health implications of containing the homelessness crisis, current technologies employed to combat homelessness, in particular technologies that are used to connect a person who is already homeless or a person who is at risk for homelessness to resources that can help remove that person from the homeless population or prevent that person from entering the homeless population. Such resources include shelter beds, counseling and treatment programs, and work-training programs. Despite their importance, accessing these resources is an endeavor that can take weeks. For instance, in the Seattle area, to access such resources, a person needs to call a phone number "2-1-1." After calling that number, a representative of one of several companies servicing that number, will give the person instructions to physically come to a provided address (known as a "Regional Access Point" or "RAP") at specific hours, where the person will be asked to answer multiple questions by a representative of the company. The answers to the questions will determine eligibility for accessing one or more of the resources. While Seattle does have a Homeless Information Management System ("HIMS") database which stores information about organizations providing resources for people that are homeless or at risk for homelessness, the information about the availability of those resources is not updated in real time—in fact, the availability information is not part of the HIMS database and is not subject to regular updates. As a result, the representatives of the companies servicing the 2-1-1 number do not know which of these organizations can accommodate the individual in question and often have to call a multitude of these organizations before finding one whose resources the individual can access. Further, HIMS can only be accessed once an individual is homeless, and due to the requirement to make a physical appearance by the individual seeking help and the lack of real-time information on the available resources, the average time that passes between a person making a 2-1-1 call and being able to access one of the resources is over two weeks. During these two weeks, the individual seeking help remains homeless, without security and help, which can have a significant impact on the individual's mental state, leaving the individual defeated and less likely to escape homelessness. Further, the requirement to make a personal appearance, only by appointment and in a particular place location (in the case of Seattle, the North Seattle Police Precinct) that may be far from where the individual is located, to receive access to the resources can discourage many individuals, either due to difficulty in making the trip or for fear of being judged by the company representatives. The shortcomings of such system are particularly evident in that only a fraction of the homeless population in King County (the county where Seattle is located) utilized shelter services (accessing which requires making a 2-1-1 call) during the winters of 2018 and 2019. In fact, an October 2019 Coordinated Entry System Racial Equity Analysis of Assessment Data by Wilkey et al, prepared by C4 Innovations of Needham, Mass., for Building Changes in Seattle, Wash., has shown that this current system has at least three elements of inherent racism and sexism, which may be a significant obstacle to someone using the system. In particular, the 2019 study showed that white males will more readily tell a government worker about their illegal activity than females or black males. This communication reluctance come down to a lack of trust in government workers. Individuals seeking help do not see what a government worker is typing and cannot be sure that the government worker is not typing a request for the individual to be arrested. As a result of this disparity in trust, the present HIMS system is significantly more likely to be used by a white male rather than minorities or people of color Accordingly, there is a need for a way to maintain up-to-date availability of resources for combating homelessness and connect individuals seeking the resources to the resources in real time.

SUMMARY

Homelessness and the burden that homelessness place on public health infrastructure can be reduced via a system and method that maintain an up-to-date database of available resources, provide a way for a person-at-need, such as a homeless or a person at risk of homelessness, to gain access to those resources immediately in their moment of crisis either on the phone or online, and provide advice to the person as needed to ensure there is a connection between the person-at-need and the resources in the moment of crisis. The system and method serve as a resource allocation tool for resource officers, social organizations (government, for-profit, and non-profit organizations at least a part of whose mission is a reduction of homelessness), and those who are in crisis and are at risk of becoming homeless, or already homeless, allowing to provide help at the moment an individual in crisis is willing to reach out for help, the first moment that they can be helped them. This tool allows social organizations to stop wasting time looking for individuals who need help, instead allowing the individuals at risk who need help in accessing resources to contact these organizations when they are ready. By removing layers of bureaucracy that are present in the current ways homelessness is addressed, this tool also reduces racism, sexism, and other biases that an individual seeking help can encounter presently while seeking relief from homelessness, thus making relief accessible to a much wider demographics than before.

As described below, the implementation of the system and method disclosed is made possible through a use of a virtual private cloud environment. The virtual private cloud provides the scalability that can accommodate any number of individuals-at-need seeking assistance, which in the United States alone is estimated at over half a million people. The use of security services, separate components facing the public Internet, and subnets storing particularly sensitive data allows to maintain security of both the system as a whole and individual sensitive data in particular as well as prevent fraudulent activity from taking place in the system. Further, as laws for storage of sensitive data (such as medical data) differ greatly between different countries as well as local jurisdictions, the use of virtual private cloud subnets allows to store data of individuals located at different geographical locations in accordance with the laws in effect in those locations. Finally, the virtual private cloud environment allows to leverage machine learning classifiers to analyze and store interactions with any number of individuals seeking help, which in turn can be leveraged to improve the system and method. Thus, the use of the virtual private cloud environment is essential to the implementation of the system and method described.

In one embodiment, a system and method for virtual cloud-based facilitation of homelessness reduction through secure, secure, real-time need assessment and resource availability tracking and allocation are provided. The system includes at least one virtual private cloud implemented by one or more physical servers and one or more physical databases. The at least one virtual private cloud includes: a resource data storage interfaced to a resource data application program interface (API) and configured to hold data associated with a plurality of providers of resources for homelessness reduction, the data including availability of resources at each of the providers, a geographic location of each of the resource providers, and a plurality of keywords associated with each of the resource providers, each of the keywords representing at least one of one of the resources provided by those of the resource providers and a trait-based restriction on providing one of the resources by that resource provider; an account data storage interfaced to an authentication API and configured to hold account information for a plurality of users; one or more subnets of the at least one virtual private cloud, each of the subnets comprising an individual-at-need data storage interfaced to an individual-at-need API and configured to store personal data associated with at least a portion of a plurality of individuals-at-need; a user interface front end service configured to receive one or more communications via one or more of the Internetworks from a computing device associated with an individual-at-need, one or more of the communications comprising credentials associated with the individual-at-need and one or more of the communications comprising data regarding the individual-at-need, wherein the individual-at-need comprises one of a person at risk of homelessness and a homeless person, and wherein the individual-at-need data comprises a geographical location of the individual-at-need, and responses to one or more prompts for information; an authentication service configured to authenticate the individual-at-need as one of the users using the credentials and the account information via the authentication API; and a resource matcher interfaced to the authentication service and the session management service. The resource matcher is configured to: store the individual-at-need data within the subnet; process the received individual-at-need data to identify those of the resources needed by the individual-at-need, a time frame when the resources are needed, and one or more traits of the individual-at-need; compare using the resource data API the geographical location, the keywords, and the availability of the resources associated with each of the resource providers to the geographic location of the individual-at-need, the resources needed by the individual-at-need, the time frame, and the one or more traits of the individual-at-need, and identify one or more of the resource providers matching the individual-at-need based on the comparison; provide via the authentication service, the user interface one or more of the Internetworks to the computing device associated with the individual-at-need a list of the matching resource providers; receive via the user interface front end service a selection of one of the matching resource providers from the computing device associated with the individual-at-need; generate information for accessing the one or more resources from the selected resource provider by the individual-at-need and provide the generated information via the user interface front end service to the computing device associated with the individual-at-need; and update via the resource data API in the resource data storage the availability of the one or more resources associated with the generated information.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Figure 1:
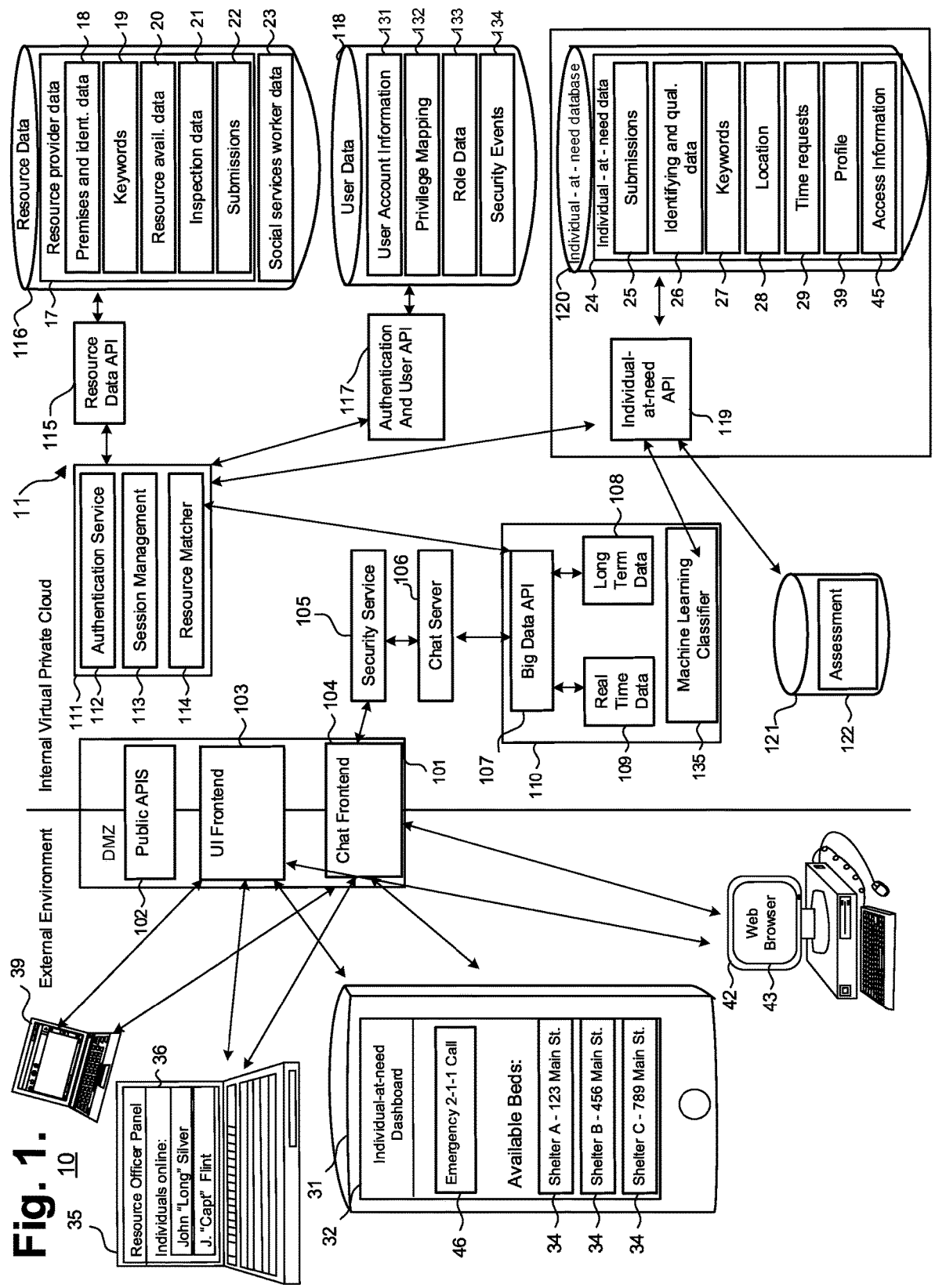
FIG. 1 is a block diagram showing a system for virtual cloud-based facilitation of homelessness reduction through secure, scalable, real-time need assessment and resource availability tracking and allocation in accordance with one embodiment.

Similarly to other situations in which a person, a person's family or pets, or property are under threat and in which a call for help (such as a 911 call) is warranted, a social crisis (such as a mental health crisis, a financial crisis that makes impossible to pay rent, or a domestic violence situation that makes highly unsuitable to remain at one's home) that leads to homelessness can be treated as an emergency for which help needs to be provided. Homelessness and corresponding public health consequences can be reduced by efficiently tracking availability of resources and connecting the individuals needing the resources with the organizations providing the resources as well as other parties who can provide assistance. FIG. 1 is a block diagram showing a system 10 for cloud-based facilitation of homelessness reduction through real-time need assessment, resource availability tracking, and multi-party communication. The system 10 includes at least one virtual private cloud environment 11, which is implemented by one or more physical servers (not shown) and databases. In one embodiment, the cloud-computing environment can be Microsoft Azure®, provided by Microsoft Corporation of Redmond, Wash., or Amazon Web Services provided by Amazon.com, Inc. of Seattle, Wash., though other cloud computing environments that allow an implementation of artificial intelligence classifier described below are also possible. In one embodiment, the data stored in the virtual private cloud 11 can be encrypted and communications between the virtual private cloud 11 and computing devices 31, 35, 39, 42 can be encrypted to protect security of the exchanged data. Other ways to perform the communications and store the data are possible. While below the components of the virtual private cloud 11 are described as being part of a single virtual private cloud, in a further embodiment, the components could be implemented using multiple virtual private clouds or using multiple geographic and cloud-availability zones.

The virtual private cloud 11 is interfaced to one or more Internetworks (not shown), such as the Internet, a cellular network, or a landline telephone network, and can communicate with a plurality of computing devices 31, 35, 39, 42 via the Internetworks. To increase the security of the virtual private cloud 11, only a portion of the virtual private cloud 11 referred to as a demilitarized zone (or "DMZ") 101 interacts directly with devices connected to the public Internet or other Internetworks external to the virtual private cloud 11. The DMZ 101 is logical external network perimeter, which is firewalled from the rest of the virtual private cloud 11 and communications between components of the DMZ 101 must pass through the firewall (not shown) prior to reaching other, internal portions of the virtual private cloud 11. As the only portions of the virtual private cloud that are exposed to the public Internet are those in the DMZ 101, the risk of successful attacks from the public Internet on the virtual private cloud 11 is significantly reduced, thus increasing the security of the data stored in the virtual private cloud 11.

The components of the DMZ 101 include a user interface ("UI") front end service 103, which receives registration and log-in requests from users, processes the requests as described below to register and authenticate the users, and upon the authentication, receives requests to take action. The DMZ further includes a chat front end service 104 that can initiate a real-time communication between different users, as further described below, and serve as the entry point and exit point for the messages to and from the users. Finally, the DMZ 101 includes public application programming interfaces (APIs) 102 that receive and respond to (via one or more of the Internetworks) for aggregated statistical information from computing devices (not shown) associated with government agencies (such as U.S. Department of Housing and Urban Development ("HUD"). In one embodiment, the public APIs can be REST APIs, though other implementations are also possible.

The virtual private cloud 11 can interact with many computing devices 31, 35, 39, 42 associated with many different kinds of users, described in detail below. Briefly, the computing devices 31 are associated with users who are individuals-at-need, individuals who are either homeless or at risk of becoming homeless. The computing devices 42 are associated with users associated with providers of resources that can be accessed by individual-at-need. The computing devices 35 are associated with users who are resource officers—individuals employed by organizations part of whose mission is helping individuals in social crisis. Such resource officers can be members of police departments, firefighting department, emergency medical services or ambulatory medical services providers (such as hospitals), whose function is to prevent or eliminate homelessness among individuals in crisis that they encounter during their jobs. Alternatively, resource officers can be social workers at government, medical, or non-profit organizations that have traditionally been involved in helping people dealing with homelessness. Other types of resource officers are possible. The computing devices 39 are associated with a still different types of users—administrators, who are supervisors of one or more resource officers who are users of the system 10. Such administrators can be part of the HUD or another organization, though other types of administrators are still possible. The administrators can see data related to the resource officers that they are supervising as well as of individuals-at-need serviced by those officers.

While the DMZ 101 receives communications from these users, other components of the virtual private cloud 11 process and take actions based on the communications from the users. In particular, the virtual private cloud 11 includes middleware services 111 that perform many of the processing functions. The middleware services 111 include an authentication service 112 that registers the users with the virtual private cloud and performs authentication of users, as further described below. The middleware services 111 further includes session management services 112, which once a user is registered and authenticated, controls which data a user can access, as described below. Finally, the middleware services 111 includes a resource matcher 114 that tracks and allocates resources to individuals-at-need, as further described below. Other components of middleware services 111 are possible and additional discrete business logic service components for the virtual private cloud 11 would be added to the middleware services 11.

The authentication service 112 is interfaced to an authentication and user API 117, which is in turn interfaced to a user data database 118, which stores non-personally identifying information about users. Such information can include user account information 131, such as user name and password that a user establishes during registration and a unique identifier associated with the user that is given to the user by the authentication service 112. In one embodiment, the unique identifier can be a globally unique identifier (GUID), though other kinds of identifiers are also possible. The user data database 118 further stores privilege mapping 132, which determines which data a particular user can look up and which actions a user can take within the virtual private cloud 111. Similarly, the user database 118 stores role data 133, which describes the role of a particular user, such as whether the user is an administrator, a resource officer, a resource provider (or an administrator of a resource provider), or still has a different role. Maintaining role data 133 separately from the privilege mapping adds audit clarity and flexibility for making changes globally or for specific locales. Finally, the user data database 118 stores data security events 134, which can be data associated with the user that may be relevant to security of the virtual private cloud 111, such as attempted attacks coming from the computing device 31, 35, 39, 42 associated with a particular users or attempted fraudulent activity performed by those users. Such security events can lead to a user being banned from using the virtual private cloud 11, though other consequences are also possible.

The data in the user data database 118 is initially set by the authentication service 112 (via the authentication and user API 117) as the authentication service receives communications via the UI frontend service 103 from the computing devices 31, 35, 39, 42 that include the user name and password as well as any other account information, and also assigns the unique identifier to the user. The authentication service 112 also sets via the authentication and user API 117 the role data 133 and the privilege mapping 132 based on the submissions of the users received via the UI frontend service 103. In some cases, the role data 133 and the privilege mapping 132 have to be confirmed by a third party prior to being put into effect—for example, in one embodiment, before a user is set as a resource officer with corresponding privileges, the user's status as a resource officer has to be confirmed by a user whose status is set as an administrator, though other embodiments are also possible. The authentication service 112 can also track the security events associated with the user and update the security event 134 data in the database 118. Similarly, after a user is registered, to allow a user to log-in, the authentication service 112 compares the user name and password received via the UI frontend service 103 to the user names and passwords stored as part of the user account information in the database 118. To add additional security, the password would not be stored in plaintext anywhere in the virtual private cloud 11. Thus, in the database 118, the password (stored as part of the user account information 131) is hashed. Similarly, when the UI frontend service 103 receives the password from a computing device 31, 35, the UI frontend service 103 hashes the password and provides the hash to the authentication service 112, which compares the hash received from the database 118 to the hash of the password received from the user device to authenticate the user.

Upon a successful log-in, the authentication service 112 assigns a set of permissions to the logged user corresponding to the privilege mapping 132 in the user data database 118 for that user (which, in object-programming, corresponds to "a logged-in session object" (e.g. "CAN READ RESOURCES=True"). Later, when a user attempts to read a particular piece of data, subsequent requests to see particular information within the virtual private cloud 11 would come from the UI frontend service 111 to the session management service 113, which would then either fetch the requested information using a corresponding API or deny access to the information based on permissions without having to interface with the authentication service 112. Likewise, a request to allocate particular resources would come to the resource matcher 114 directly from the UI frontend service 101 and the resource matcher 114 would grant or deny the request based on the set permissions and without needing to interface with the authentication service again. The permissions can be implemented as the UI frontend service 103 providing a token to into the http session cookies of the user device 31, 35, 39, 42, with the token being associated with a certain set of permissions for the duration of the logged-in session, though other implementations are also possible. As the permissions are assigned by the authentication service 112 to the logged-in user object at time of log-in, if the permissions are changed by an administrator of the virtual private cloud 11, the user must login/logout for any permission changes to be realized.

As mentioned above, some of the computing devices 42, interacting with the virtual private cloud 11 are associated with providers of resources that can be used to combat homelessness. Such resource providers can be governmental organizations, non-profit charity organizations, private individuals, or business entities willing to contribute the needed resources. The users associated with the computing devices 42 can either be the resource providers themselves (in the case of individuals being the resource providers) or resource administrators—people working at those of the resource providers that are organizations.

The resource providers can contribute a variety of resources. For instance, one of the resources that can be contributed by a resource provider is an opportunity to sleep for a particular timeframe in a bed and securely store belongings during that timeframe ("secure bed"). For transitioning a homeless individual from sleeping in the streets or in an unsanctioned encampment to a facility where they have a dedicated bed and a way to securely store their belongings is an important step towards removing that individual from the homeless population. Not only does having such a secure bed provide a sense of security that may help individuals to rebuild their lives, the bed also provides a meeting point where the individual can often be reached by medical and social workers. Similarly, for a person who is not yet homeless but is at risk for homelessness, having access to that secure bed may prevent the negative psychological effects of having to sleep in the streets, helping that person avoid becoming homeless. Such resources can be contributed to government-sponsored shelters and non-profit shelters, as well as business entities, and individuals willing to open up their homes and provide a bed.

Other kinds of resources can also be contributed by the resource providers. For example, such resources can be counseling, substance abuse treatment programs, and work-training programs. Still other kinds of resources are possible.

The virtual private cloud 11 provides a way to obtain data 17 regarding the resource providers and track availability of the resources by the resource providers in real time. In particular, each of the resource providers who wants to contribute resources for allocation by the system 10, after registering with the virtual private cloud and logging in, or as part of the registration process, makes a submission 22 to the UI frontend service 103 via one or more of the Internetworks, which in turn is provided by the UI frontend service to the resource matcher 114. Such submission 22 can be made via a web browser 43 running on the computing device 42 by visiting a particular website associated with the virtual private cloud 11 and responding to prompts for information. Other ways to make the submissions are possible, such as via a dedicated mobile application. The submission 22 can include keywords 19 that represent resources provided by the resource providers or a trait-based restriction on providing one of the resources by that resource provider. For the purposes of this application, the term "keyword" also includes key phrases. For example, a keywords such as "bed," "substance addiction counseling," and "work-training program" represent the particular resources that the resource provider is ready to contribute to combat homelessness: overnight access to a bed, counseling for people with substance abuse issues, and a work-training program. Other keywords such as "female-only" and "drug-free" provide restrictions on who can use the particular resources, with the first keyword limiting the use to a specific gender and the second keyword restricts individuals using illegal drugs from using the resources. Such restrictive keywords can also relate to particular economic traits of an individual, such as an income cut-off level at which the resources can be provided. The submissions 22 can also include free-form text that is provided in response to prompts for information. The submission 22 also include data 18 that identify the resource provider (such as the name of that resource provider and any other identifying information, such as a business license number, a tax id, or another piece of government-issued identification) about the premises where the resources are provided. For example, the premises information can include an address of the premises, hours of operation of the premises, contact information such as e-mail address and phone number, any access information needed to enter the premises, and a picture of the premises. A submission 22 also includes data 20 regarding availability of the resources. For example, if the resources provided are secure beds, the resource availability data 20 includes an identifier of each of the beds provided by that resource provider and information on when that bed is available (such as a calendar). The identifier of each of the beds can include a physical address of the premises where the beds is located. If there are multiple beds in the same premises, such as a shelter, the identifier can include additional parts; for example, three bed located at 123 Main Street can be identified as 123 Main Street A, 123 Main Street B, and 123 Main Street C. Still other kinds of identifiers are possible. Likewise, if a resource is a service, such as substance abuse counseling or a job-training program, resource availability data 20 can include an identifier of the service and a calendar of available appointments.

The data provided in the submissions 22 is stored by the resource matcher 114 within a resource data storage 116 by communicating with a resource data API 115 that is interfaced to a resource data storage 116 in the cloud-computing environment. By making the submission, the resource providers are committing to allocating the resources only through the system 10 (including, if they get any walk-in individual-at-need, setting up the resource allocation for that individual through the virtual private cloud 11). Accordingly, every time the resource matcher 114 allocates one of the resources to a particular person, the resource matcher 114 can update in real time the resources available to other people. Further, if the availability of particular resources changes due to factors other than the resources being used, such as, for instance, if secure beds become unavailable due to flooding of the premises, the resource provider can make a secondary submission 22 with updates regarding availability, allowing to keep the availability of the resources up-to-date.

Further, in addition to data that is explicitly provided in a submission 22, the virtual private cloud 11 can derive additional data from the submissions 22. Thus, the virtual private cloud includes an artificial intelligence (AI) and machine learning virtual server cluster 110 that implements a machine learning classifier 135 that is trained to classify free-form text as indicative of particular keywords 19 being present. For example, if a shelter representative preparing the submission 22 does not select a keyword signifying that that the shelter is alcohol free, but provides free form text saying "our shelter does not allow use of alcohol," the classifier 135 will classify the free-form text to indicate that the shelter is alcohol-free and add the corresponding keyword 22 to the data 17 for that resource provider. The classifier can be trained by feeding the classifier free-form text labeled by a human reviewer as associated with particular keywords, with the human reviewer reviewing initial results of classification by the trained classifier and correcting mistakes.

As further described below, the classifier 135 can perform other kinds of analysis in addition to processing submissions 22. The classifier 135 is interfaced to two databases 108, 109 in which the classifier 135 stores results of various kinds of analysis that the classifier 135 performs. The two databases 108, 109 store different kinds of information. One database 108 can be an Apache Spark™ database developed by Apache Software Foundation of Wakesfield, Mass., though other implementations are possible. The database stores real-time data 140—data that is used during an ongoing interaction with a user, such as keywords derived from that user's submissions. The other database 109 is a batch (non-real-time) database that stores long term data 141—statistics aggregated from multiple interactions, such as what types of resources provided to individuals with certain traits result in the best long-term outcomes," and "which shelters are most successful in graduating individuals to stable housing in a particular locality, though other statistics are also possible. The statistics database 109 can be implemented using Apache Hadoop® database developed by Apache Software Foundation of Wakesfield, Mass., though other implementations are possible. As both databases 108, 109 can store data from a myriad (millions, billions, and potentially trillions) of interactions, they can be referred as big data databases 108, 109.

The artificial intelligence (AI) and machine learning virtual server cluster 110 includes a big data API 107 that allows the classifier 135 to interface with various other elements in the virtual private cloud 11 and provide the data 140, 141 from the databases 108, 109 to these elements, such as the middleware services 111. Additionally, the long-term data 141 can be provided by the big data API to the Public APIs 102 (via the session management services 113) to eligible entities, such as HUD.

Similarly, the resource matcher 17 can also pull additional data 17 regarding the resource providers from third party sources (via the UI frontend service 101) and add that additional data 17 to the resource data storage 116. For example, the resource matcher can find a picture of the premises (which can be stored as part of the premises data 18) of the resource provider by accessing over one of the Internetworks a publicly available geospatial search program, such as Google® Earth provided by Google LLC of Mountain View, Calif., though other geospatial search programs are also possible. Similarly, the resource matcher 114 can access a publicly available mapping program to prepare directions to the premises as further described below, which can be stored as part of the premises data 18.

Figure 4:
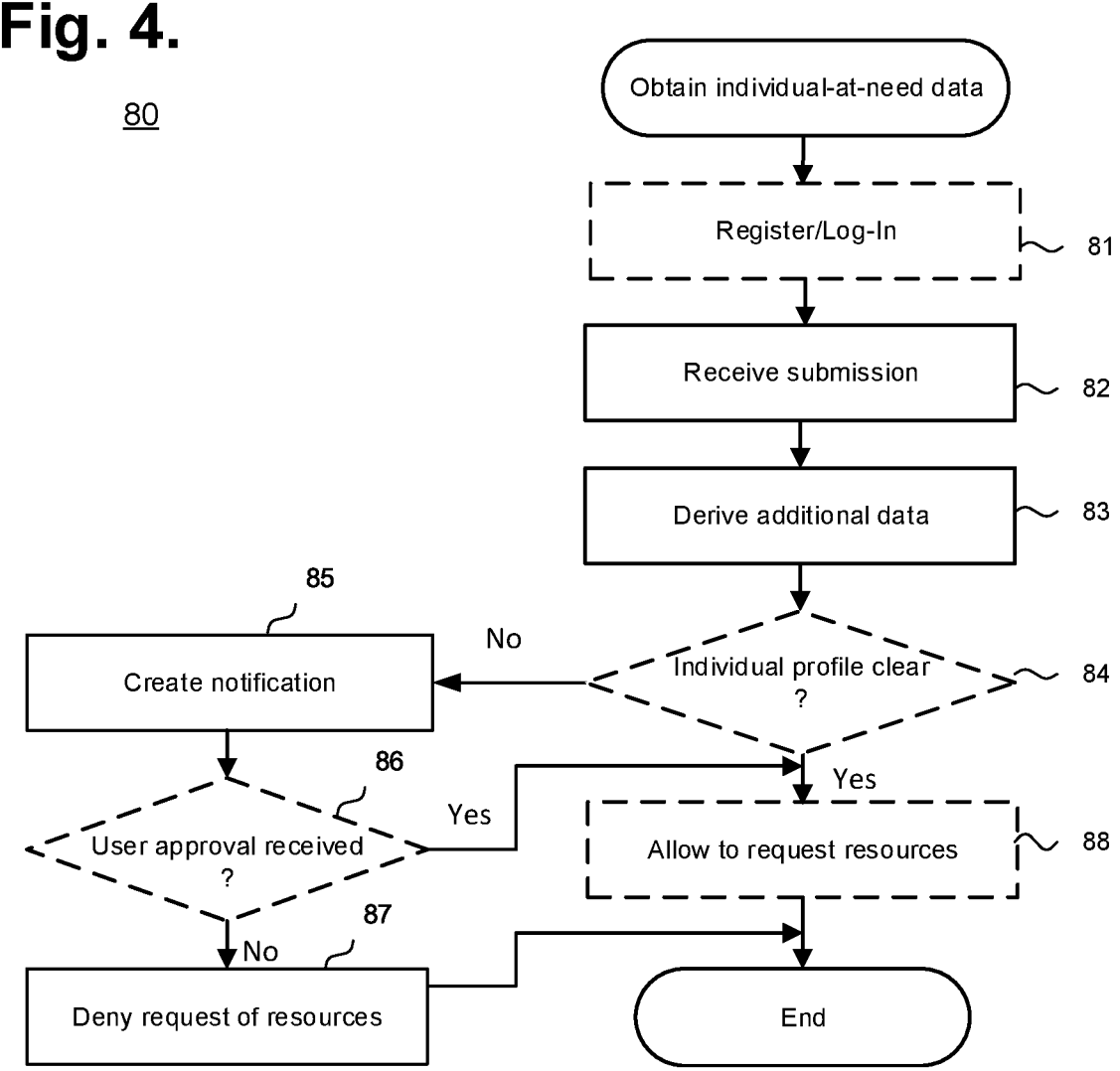
FIG. 4 is a routine for obtaining individual-at-need data for use in the method of FIG. 2 in accordance with one embodiment.

Finally, as further described below beginning with reference to FIG. 4, after receiving an initial submission 22 from a resource provider, but before the resources offered by that provider are offered to individuals, an inspection of the premises of the resource provider is performed to insure that the premises, such as premises hosting secure beds satisfy, minimum requirements. The inspection is scheduled by the resource matcher 114 by automatically reaching out via the UI frontend service 103 and one of the Internetworks to the computing device 42 associated with that resource provider, either through a dedicated application, a web browser 43, or other communication techniques, such as e-mail with a range of possible inspection times. Upon receiving a confirmation of the time for an inspection from the resource provider (possibly via the same medium via which the initial communication to schedule the communication was sent), the resource matcher 114 can provide the inspection time to a third party via a computing device (not shown) of that third party via one of the Internetworks (and the UI frontend service 103). Upon the third party performing the inspection, the third party can provide the results to the resource matcher which can store the results via the resource data API 115 as inspection data 21 in the resource data storage 116. If the results of the inspection are satisfactory, the resources of that provider are offered to individuals needing them. If not, the resources are not offered through the system 10.

In addition to providing a way to keep up-to-date information about availability of resources, the system 10 also allows a way for an individual-at-need to connect to resources, without having to experience layers of bureaucracy and biases of people administering that bureaucracy. An individual-at-need could be a person who is already homeless or a person who is at risk of homelessness. The definitions of a person who is homeless or is at risk of homelessness that have been provided by the U.S. Department of Housing and Urban Development at the following web addresses is hereby incorporated by reference:

1) https://files.hudexchange.info/resources/documents/HomelessDefinition_RecordkeepingRequirementsandCriteria.pdf; and 2) https://files.hudexchange.info/resources/documents/AtRiskofHomelessnessDefinition_Criteria.pdf. Other definitions could also be used by the system 10.

While the description below uses describes a single individual-at-need, the system 10 could also be utilized to connect a group of individuals, such as a family, to the resources in the same manner mutatis mutandis.

The individual-at-need can contact the resource matcher 114 via one of the Internetworks by utilizing a computing device 31 via the UI frontend service 103. The contact can be done via a web browser executing on the computing device 31 or a dedicated computer application, such as a mobile application if the computing device 31 is a mobile device. Further, either through a cellular network or a landline telephone network connection or a voice-over-internet-protocol (VOIP), the computing device 31 can establish a voice connection to the DMZ 101. Thus, the individual-at-need can dial the number 2-1-1 (or another number assigned to the virtual private cloud 11), either via a keypad of the device 31 or by pressing a button 46 of a user interface 32 of the computing device 31, to establish the voice connection. Via the mobile application or a web page that the individual accesses via a web browser, or a voice connection, the resource matcher 114 prompts the individual to enter information that can be used to determine the kind of resources that the individual may receive and connect the individual to those resources. The prompts for information can be based on assessment 122, such as the HUD's Vulnerability Index, which can be stored in the dedicated database 121. The individual may respond to those prompts by making a submission 25 that includes selections of particular keywords 27 identifying the need of the individual for particular resources (such as a secure bed, addiction services, or job-training) and traits of the individual, such as demographic information (such as gender or age group), medical information, such as particular conditions requiring special accommodations, or traits identifying previous history of substance abuse or criminal history. The keywords 27 can be selected by one or more of: checking off a particular checkbox, by answering, yes-no or multiple choice questions, or by entering free-form text into in response to prompts for information that can be linked to the keywords 27 by the AI classifier 135 as described above with respect to the resource provider keywords 19. Further, as described below, additional keywords may be added by the AI classifier based on the real-time communication (chat) that the individual-at-need may be engage with a resource officer. The submission 25 can also further include a time frame request 29, such as a particular date or series of dates, for when the resources such as a secure bed are needed. The submission 25 also include a geographic location 28 of the individual, such as a particular city or town, a neighborhood in the city, or a particular physical address. The submission 25 also includes identifying information 26 of the individual, such as name, birthdate, and social security number as well as information, such as income information, that can be used to determine if the individual qualifies for the resources under whatever terms the resources are provided.

The information provided in the submission 25, as well as derived based on the submissions is stored by the communication module in the storage 16 are part of individual-at-need data 24. The individual-at-need data can also store a profile 30 of the individual, which can include information based on extended interactions with the individual-at-need (such as a failure to show up to use the resources allocated to that individual).

As seen from above, the information provided by the individuals-at-need in submissions 25 can be very sensitive, triggering concerns about keeping the data secure. The requirements for security are necessitated both by the laws in place, such as HIPAA, GDPR, and other local and national laws, as well as the necessity for individuals-at-need to have trust in the system 10 in order to take advantage of what the system 10 offers. In addition, as the laws for data storage differ from one jurisdiction to another, the task of keeping the data storage compliant with applicable laws becomes more complicated. The use of the virtual private cloud 11 allows to increase the security with which the individual-at-need enters data 24 and complies with the diverse legal requirements for personal data security. In particular, the virtual private cloud includes one or more subnetworks (or "subnets") 136, a logical subdivision of the virtual private cloud 136. Each subnet 136 includes a storage 120 in which the individual-at-need data 24 is stored. Each subnet 136 further includes an individual-at-need API 119 interfaced to the middleware services 111, the authentication and service API 117 (and through the API 117 to the user data storage 118) and the database 121 storing the assessment. When receiving a request for individual-at-need data 24 from the resource matcher 114, the individual-at-need API 119 checks the permissions of the user on whose behalf the resource matcher 114 is requesting the data (by checking the privilege mapping 132 in the user data database 118) before providing the requested data, thus providing an additional layer of security for individual's-at-need data 24. Further, if there is an attack that penetrates the DMZ 101, and even one of the middleware services 111, the ability of that attack to do damage is limited by closing communication except through necessary APIs to the most sensitive data, thus increasing the amount of effort necessary to access the sensitive data within the subnets 136.

As the virtual private cloud 11 can include multiple subnets 136, data 24 associated with individuals-at-need living at different physical locations could be stored in different subnets 136, allowing to create data security of each subnet 136 that is consistent with the legal regime in effect in that location. Thus, the data 24 of all of the individuals-at-need living in Seattle, Wash. could be stored in one subnet 136, the data of all the individuals-at-need living in San Francisco, Calif., could be stored in a different subnet 136, and the data of all the individuals living in Brussels, Belgium, could be stored in a still different subnet 136. In one embodiment, to further ensure compliance with the any local laws regarding sensitive data storage, the physical servers and database implementing a particular subnet 136 can be located in the locality under whose laws the data 24 is stored in that subnet. Thus, a subnet 136 storing data 24 of individuals-at-need in the European Union would be implemented by the servers and databases physically located in the European Union and a subnet 136 storing data 24 of individuals-at-need in Seattle, Wash. would be implemented by the servers and databases physically located in Washington State. Nevertheless, as all of the subnets 136 remain part of the same virtual private cloud 11, if an individual-at-need moves from one location to another, that individual-at-need's data 24 could still be accessed and transferred from one subnet 136 to another 136, thus ensuring that an individual-at-need using the system 10 is not confined to a single location.

The resource matcher 114 is able to process the data submitted by the resource providers and the individuals-at-need and almost instantaneously identify those of the resources that can be accessed by the individual-at-need, thus avoiding the prolonged waiting period that homeless people and people at risk of homelessness currently experience. In particular, the resource matcher 114 matches the available resources to the resources needed by the individuals-at-need. In performing the matching, the resource matcher 114 compares the geographical locations of premises (stored as part of premises data 18) of resource providers whose data 17 is stored in the storage 16 and the geographical location 28 of the individual-at-need. If the locations are within a predefined distance from each other (a distance that is either preset for all individuals at need or customized based on the submissions 25 of a particular individual-at-need), then the geographically-proximate resource providers are determined to be a possible match for the individuals. The resource matcher 114 also considers whether the resources requested by the individuals and the traits of the individuals match the resources provided by the geographically-proximate resource providers and the trait-based restrictions on use of those resources. For example, if the keywords 27 submitted by the individual indicate that the individual is looking for a secure bed and is a male, resource providers whose keywords 19 indicate that they provide secured beds only to women would be ruled out, but resource providers whose submitted keywords indicate that they provide secured beds to men will be considered a potential match. Finally, the resource matcher 114 considers the availability data 20 from the potentially matching resource providers of determine if the resources requested by the individual are available at the time 29 requested by the individual. A resource provider that satisfies geographic requirements, has the resources requested by the individual at the time requested by the individual, and that does not have any trait-based restrictions preventing the use of the resources by that individual is determined to be a matching resource provider for that particular individual.

The resource matcher 114 generates a list of one or more matching resource providers and provides via the UI frontend service 103 the list via one or more of the Internetworks to the computing device 31 associated with the individual-at-need who requested the resources. The list can be displayed as part of a user interface 32 provided on the computing device 31 either via a web browser or a dedicated application, with the results 34 in such list including the name and address of each of the matching resource provider, though other information can also be displayed. The individual requesting the resource can select one or more of the results 34 in the list via the user interface 32 (such as by clicking on the displayed result or a particular button in the user interface 32) to access the resources provided by these resource providers. The selection is sent by the computing device 31 over one or more of the Internetworks and to the UI frontend service 103 to the resource matcher 114, which, optionally, sends a request to the one or computing devices 42 (via the UI frontend service 103 and one or more of the Internetworks) of the one or more selected resource provider for a confirmation that they will accept the individual to use their resources. The request for the confirmation serves to make sure that no last minute changes in availability have taken place due to external factors, such as adverse weather or illness. Upon receipt of the confirmation via one or more of the Internetworks from the computing device 43 of the selected resource provider, the resource matcher generates the information 45 for accessing the requested resources from the selected resource provider. The access information 45 can include directions to the premises of the resource provider, contact information of the resource provider, picture of the premises of the resource provider, hours of operation of the resource provider, and any access information such as a security code necessary to access the premises. The resource matcher 114 can provide the access information to the individual-at-need's computing device 31 via the one or more Internetworks and the UI frontend service 103, allowing the individual to access resources. Optionally, the resource matcher can request and receive via one of the Internetworks (and the UI frontend service) a confirmation from the resource provider that the individual has made use of the requested resource at the designated time. If the individual has not made use of the resource or stopped using the requested resource before an expiration of the requested time frame (such as leaving a particular shelter bed before the expiration of the time period for which the shelter bed was requested), the resource matcher 114 can add a note to the profile 30 of the individual, which may prevent the individual from making further use of the system 10 in the future or influence what resources are allocated to that individual in the future, as described further below. In a further embodiment, the resource matcher 114 can ask the resource provider to send a note that the individual had not made timely use of the system 10. The allocations of the resources are also monitored by the classifier 135 and can be stored as part of the long-term data 141. In addition, the classifier 135 can analyze how and if an individual-at-need with particular characteristics has taken advantage of the allocated resources and store as the results of the analysis in the database 109, which can be taken advantage of by the resource matcher 114 when making subsequent allocations. For example, if a 40 year old male with a mental illness left Shelter A after only a single night but stayed at shelter B for two weeks in a row, the resource matcher 114 would allocate a bed at shelter B to another 40 year old with the same mental illness.

Even when the information regarding possible resource provider is presented in a readily understood format, individuals-at-need may need additional assistance to make a selection of a resource provider and to use the system 10 in general. Such additional advice is provided by a resource officer. The individual-at-need may interact with the resource officer in person, such as if the resource officer is part of an emergency service and finds the individual-at-need in crisis or if the individual-at-need has been admitted to a hospital or another institution. In that case, the resource officer can either guide the individual-at-need in interacting with the virtual private cloud 11 and filling out the assessment 122. Alternatively, if the individual-at-need does not have a computing device 31 that can access the system 10, the resource officer can use his or her computing device 35 to answer question in the assessment 122 and provide other information to the virtual private cloud to set up the account for the individual-at-need and allocate resources to the individual-at-need. Thus, the computing device 42 of the resource officer also becomes associated with the individual-at-need. As this process would be collaborative, the individual-at-need would feel involved in what resources are allocated to him or her than what happens when interacting with levels of bureaucracy that are currently used to address the homeless crisis.

Even when the individual-at-need and the resource officer are not face-to-face, they can still be connected via the chat frontend service 104 and a chat server 106 interfaced to the chat frontend service 104. In particular, the chat frontend 106 interfaces via one or more of the Internetworks with computing devices 35 associated with resource officers that are online and who can be assigned to interact with individual-at-need that requires assistance. The resource officers who are connected to the individual-at-at-need may work for the social services that are resource providers and whose data 17 is stored in the storage 116. Alternatively, the resource officers can be primarily associated with the virtual private cloud 11, with their primary job being guiding individual-at-need through the individual-at-need.

As further described below, in one embodiment, a resource officer is automatically assigned by a chat server 106 to communicate in real-time with one of the individual-at-need. In a further embodiment, a resource officer who is online can initiate a conversation with one of the individuals-at-need. Thus, the chat frontend 104 can provide to the computing devices 35 of the resource officer a list of individuals-at-need 37, 38 currently interacting with the virtual private cloud 11 ("online") via a user interface 36 that can be provided via a web browser (with the resource officer accessing a particular website) or a dedicated software application. If a resource officer selects one of the individuals 37, 38, the chat front end 104 can provide information regarding the current activity (by interfacing with the middleware services 111 handling the request) of the individual 37, 38 in the system 10 to the computing device 35 of that resource officer. If the resource officer sees that the individual 37, 38 is stuck on a particular screen, the resource officer request (such as by pressing a particular button in the user interface 36) an interaction in real time with the individual. For example, upon receiving a request from the computing device 35 of the resource officer, the chat frontend 104 can pass that request to a chat server 106 that will establish a real-time chat between the resource officer and the individual-at-need, as described below. The messages can be presented in a chat window that is shown in the user interfaces 36, 32 of the computing devices 35, 31 of the social service officer and the individual-at-need, allowing the resource officer to provide advice to the individual-at-need. The resource officer can also make a request to the chat frontend service 104 (which would in turn communicate the request to the session management service 113, which would request the data from the individual-at-need API 119) and be provided via one or more of the Internetworks data 24 regarding the individual-at-need with whom the resource officer is interacting to help the interaction. Other kinds of real time communication can be established, such as via a voice protocol or a video protocol.

Once the resource officers are connected to the individuals at need, the resource officers can help the individuals-at-need fill out the assessment 122 and set-up their account, and also become problem solvers attempting to use Diversionary Tactics to utilize the resources already available to the person. The UI frontend service 103 provides the resource officers a portal through which they can access availability of the resources 20, as well as other data 17 about the resource providers. The resource officer can create a delineated plan on their portal as a guide, with a calendar for resource officer to follow up with the individual-at-need, including pop up reminders and a customizable drip campaign. If the individual-at-need is able to repeatedly interact with the virtual private cloud 11, the individual-at-need can similarly be provided via the UI frontend service 103 a portal where the individual-at-need is provided a calendar, pop-up reminders, and a customizable drip campaign for following-up with the resource officer. To preserve the privacy of the individual-at-need, in one embodiment, the communication can be performed using an encrypted communication protocol. As mentioned above, the chat frontend service is part of the DMZ 101, the only part of the virtual private cloud 11 exposed to the public Internet. To further reduce security risks, the chat frontend service 104 forwards messages (including any voice or VOIP communications) received from computing devices 31, 35 of the resource officers and the individual-at-need to a chat server 106 that does the processing necessary to enable the conversation between a particular individual-at-need and a particular resource officer. Such processing can include assigning a particular resource officer to communicate with a particular individual-at-need, creating the chat session and updating any privilege mapping data such that a resource officer can view the data 24 of the individual-at-need the resource officer is chatting with. The number of chat servers deployed can be scaled up based on demand—thus if too many chats need to be supported for a current number of deployed servers, an additional server 106 would be deployed.

The automatic assignment of a particular resource officer to communicate with an individual-at-need can be done in a number of ways. In one embodiment, the assignment can be done strictly based on availability—the chat server would select any of the resource officers who are logged-in and who are not engaged in a communication with another individual-at-need. The assignment could also take into account past history of the individual-at-need and resource officers. For example, if multiple resource officers are available to communicate with the individual-at-need, the chat server could select the resource officer who has previously interacted with that individual-at-need. Likewise, if a particular resource officer has addiction counseling skills and the individual-at-need is known as having an addiction, the chat server 106 could take these traits into account when making the assignment.

While above the real-time communication is described as a text communication, the communication could be also include a voice communication (such as through via a phone line or a VOW protocol).

In one embodiment, the communication between the individual-at-need and a resource officer happens every time an individual-at-need uses the system 10. In a further embodiment, the communication can be mandatory only during registration, and subsequently, the individual-at-need could use the virtual private cloud without having to interact with the resource officer every time.

As the system 10 allocates valuable resources, preventing fraud and other malicious or illegal activity is important for continued viability of the system 10. To prevent such illegal activity from taking place, the virtual private cloud 11 employs a security service 105 that monitors the messages exchanged by a resource officer and an individual-at-need and analyzes the messages to detect fraud or otherwise malicious or illegal activity. Upon detecting such activity in the conversation, the security service 105 would take an action, such as sending a report via the UI frontend service to a designated person as well as taking one or more automated actions (such as stopping the conversation or banning one or more participants), though other actions are also possible. In one embodiment, the security service 105 can be interfaced to both the chat frontend service 104 and the chat servers 106 as shown with reference to FIG. 1, with all of the messages being exchanged reaching the security service 105 before reaching the chat servers 106. Alternatively, the security service 105 can be interfaced only to the chat servers 106, analyzing messages only once they arrive to the chat servers 106. Further, while the security service 105 is shown with reference to FIG. 1 as being internal to the virtual private cloud 11, in a further embodiment, the security service 105 could be external to the virtual private cloud 11 and receive the messages being exchanged through the chat frontend service 104. In one embodiment, the chat frontend service 105 can be VA Shield™ software provided by Scanta Inc. of San Francisco, Calif., though other implementations are also possible.

In addition to being monitored by the security service 105, the real-time communications between a resource officer and an individual-at-need are also monitored by the AI classifier 135. The results of the analysis are similarly stored in the databases 108, 109, and can be used to improve the functioning of the system 10 or of other homeless reduction services that could advantage of the collected data. The results of the analysis can also be used by the resource matcher 114 in allocating particular resources to an individual-at-need. For example, if the individual-at-need mentions the word "family" frequently during the conversation (such as with a frequency above a predetermined threshold), the AI classifier will add "family-friendly" as one of the keywords 27 associated with the individual-at-need and the resource matcher 114 will attempt to provide family-friendly resources.

Finally, while the virtual private cloud 11 in performs all aspects of allocating resources to a particular individual-at-need, in a further embodiment, the virtual private cloud 11 can be interfaced to computing device (not shown) implementing a third party software application for interfacing with individual s-at-need. As such third party software application will likely lack access to real-time resource availability data, UI frontend service 103 can provide the resource provider data 17 for further utilization in combatting homeless.

The physical servers and databases implementing the virtual private cloud 11 as well as computing devices 31, 35, 39, 42 can include components conventionally found in programmable computing devices, such as one or more CPUs, memory, input/output ports, network interfaces, and non-volatile storage, although other components are possible. The servers can each include one or more modules for carrying out the embodiments disclosed herein. The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and each of the servers 12 can act as a specialized computer. For instance, when the modules are implemented as hardware, that particular hardware is specialized to perform the communications and analysis that other computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. While the computing devices 35 and 42 are shown with reference to FIG. 1 to be laptop computers, other kinds of computing devices 35, 42 such as desktop computers, smartphones, and tablets, are possible. Similarly, while user devices 31 and 39 are shown as a smartphone and a desktop computer respectively, such devices can be other computing devices capable of connecting to one of the Internetworks 41, such as tablets and laptop computers.

While in the description above, the individual-at-need is mostly described as submitting data in text form, in a further embodiment the computing device 31 could be a stationary phone or a mobile phone without a textual interface, and the individual could contact the DMZ 101 by calling a particular phone number, such as the 2-1-1. In that embodiment, the individual speaks to answer the prompts for information, and the UI frontend service 103 or the chat frontend service 104 performs speech recognition to translate the speech into text and stores the text in the storage 16. The original submission 25 can still be stored in the sound format in the storage 120, allowing to double-check the accuracy of the speech recognition. Information could also be provided to the individual-at-need in audio form by the UI frontend service or the chat frontend service 104 utilizing a text-to-speech converter. In this way, accessing help for a social crisis that can lead or already led to homelessness can be like calling 911 for other types of crisis. Further, once the individual-at-need establishes real-time communication with a resource officer (which can be a voice communication as described above), the resource officer can enter information into the virtual private cloud 11 on behalf of the individual-at-need, thus reducing the need for machine-to-individual-at-need communication.

The use of the virtual private cloud 11 provides the scalability that can accommodate any number of individuals-at-need seeking assistance, which in the United States alone is estimated at over half a million people. The use of security services 105, the DMZ 101, and subnets 136 storing particularly sensitive data allows to maintain security of both the system as a whole and individual sensitive data in particular as well as prevent fraudulent activity from taking place in the system. Likewise, the use of virtual private cloud subnets is essential for complying with the varying legal regimes in various places where the individuals-at-need can reside, thus allowing the same system 10 to serve individuals-at-need in various jurisdictions while remaining fully compliant with applicable laws. Finally, the virtual private cloud environment allows to leverage machine learning classifiers to analyze and store interactions with any number of individuals seeking help, which in turn can be leveraged to improve the system and method. Thus, the use of the virtual private cloud environment is essential to the implementation of the system and method described herein.

Figure 2:
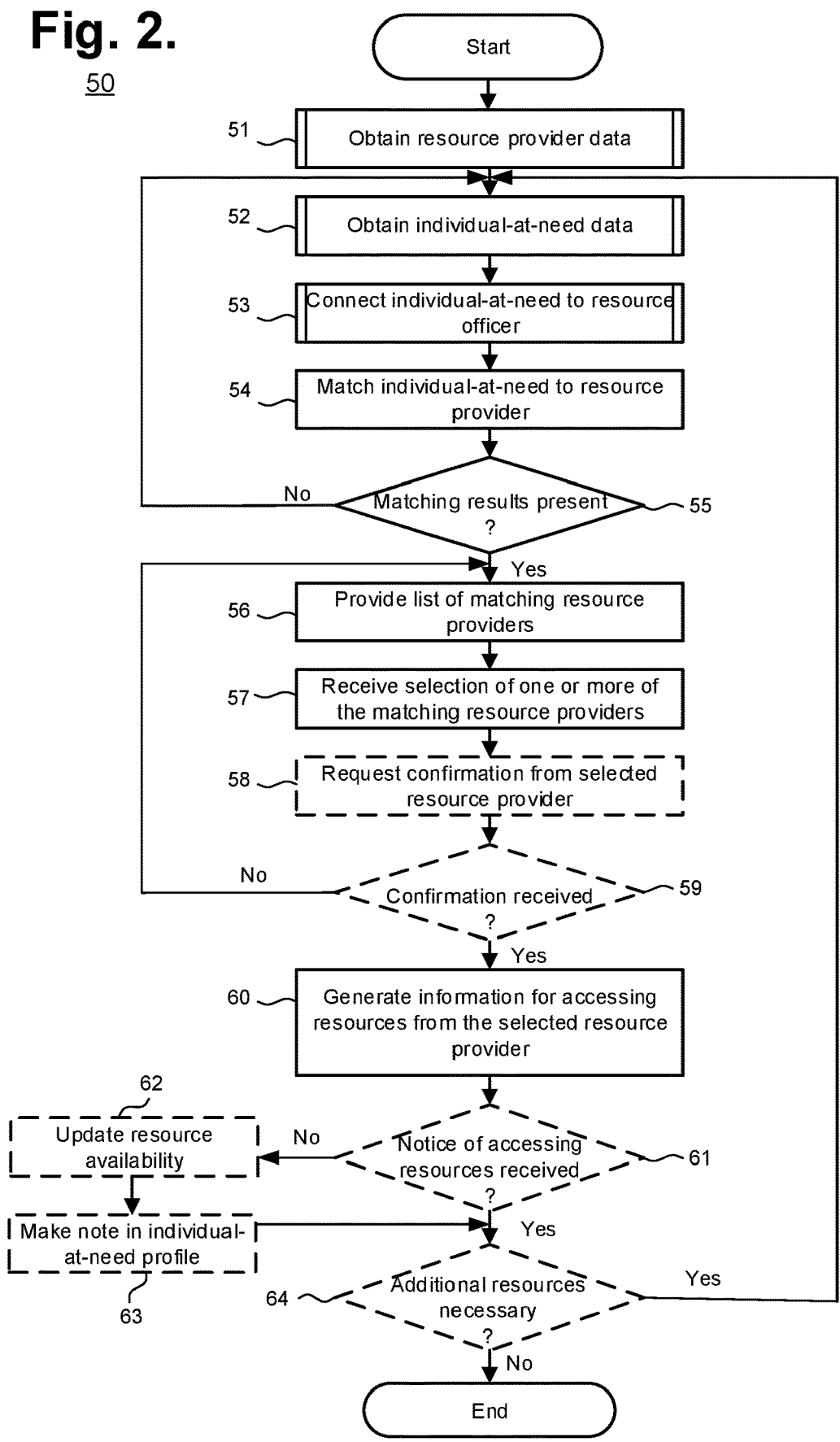
FIG. 2 is a flow diagram showing a method for virtual cloud-based facilitation of homelessness reduction through secure, scalable, real-time need assessment and resource availability tracking and allocation in accordance with one embodiment.

By having an easy-to-use, almost-instantly accessible way to view up-to-date information on available resources and connect to those resources, a homeless person or a person at risk of homeless can make large steps towards moving away from homelessness, reducing the size of the homeless population and the strain on public health infrastructure that is associated with a large homeless population. In particular, the system 10 and method 50 described herein provide a tool that is accessible from almost anywhere, including in emergency situations by resource officers who are integrated into emergency services, such as police department, fire department, or emergency medical services. Thus, instead of arresting a person in crisis, with that person becoming homeless following their release, a resource officer integrated into a police department has a tool at their disposal that allows to allocate needed resources to provide this person shelter and other kind of aid that may prevent the person from becoming homeless. Ultimately, this tool allows to reduce the burden on medical and other infrastructure, reduce public health hazards, and markedly improve people's lives. FIG. 2 is a flow diagram showing a method 50 for virtual cloud-based facilitation of homelessness reduction through secure, scalable real time need assessment and resource availability tracking and allocation in accordance with one embodiment. The method 50 can be implemented on the system 10 of FIG. 1. Initially, data 17 regarding a plurality of resource providers is obtained by the resource matcher 114 (step 51), as further described above and below with reference to FIG. 3. Data 24 regarding an individual-at-need can is obtained by the virtual resource matcher 114 (step 52), as further described above and below with reference to FIG. 4. The individual-at-need is connected by the chat front end 104 to a resource officers currently online and real-time communication between the parties is established (step 53), allowing the resource officer to provide advice to the individual-at-need and engage in Diversionary Tactics, as further described below with reference to FIG. 5 below and FIG. 1 above. In one embodiment, step 53 can be part of step 52. In a further embodiment, step 53 can be a separate step. The resource matcher 14 performs a comparison of the data 24 associated with the individual-at-need with the data 17 associated with the resource providers and identifies matching resource providers (step 54). As described above with reference to FIG. 1, the comparison is performed based on the geographical locations of the resource provider premises and the individual-at-need, the kinds of resources that are requested by the individual-at-need and that are provided by the resource providers, any trait-based restrictions imposed by the resource providers and the traits of the individual-at-need, and the availability of the resources at particular times and the times that the individual-at-need requested those resources. A resource provider that is within a predefined distance from the individual-at-need, that has the resources requested by the individual at the time requested by the individual, and that does not have any trait-based restrictions preventing the use of the resources by that individual is determined to be a matching resource provider for that particular individual-at-need. The matching can also take account statistical data 141 regarding resources previously allocated to individuals-at-need with similar characteristics and their utilization of the allocated resources, as described above with reference to FIG. 1. The matching can also take into account real-time data 140, including analysis of a result of a chat involving the individual-at-need stored in the database 108, as described above with reference to FIG. 1.

If no matching results 34 are present (step 55), the method 50 returns to step 52, where a modification of the data 24 entered by the individual-at-need is requested. If matching results 34 are available (step 55), a list of the matching resource providers is provided by the resource matcher 114 over one or more Internetworks to the computing device 31 of the individual-at-need (step 56). A selection of the one or more matching resource providers is received by the resource matcher 114 (step 57) and optionally, a confirmation from the selected resource providers that the individual-at-need can use the requested resources at the requested time is requested by the resource matcher over the one or more Internetworks, such as by sending an e-mail or a message through a dedicated software application, though other ways to request the confirmation are possible (step 58). If the confirmation is not received within a predefined time period or if a rejection is received (step 59), the method 50 returns to step 56, with the resource provider who failed to confirm being removed from the list of matching resource providers and the updated list being displayed to the individual. If the confirmation is received (step 59) (or not requested), the method 50 moves to step 60, where information 45 for accessing the resources from the matching resource providers who provided the confirmation is generated by the cloud-computing environment 11 and provided to the individual-at-need's computing device 31 via one of the Internetworks. Optionally, if a notice that the individual-at-need has utilized the resources for which the information 45 has been generated is not received, the resource matcher 114 can update the availability of those resources (step 62) and make a note in the profile 30 of the individual-at-need (step 63), with the method 50 moving to step 64. If the notice is received, the method 50 moves step 64. If the individual-at-need requires additional resources (step 64), the method 50 returns to step 52. If the individual-at-need does not require additional resources, the method 50 ends.

Figure 3:
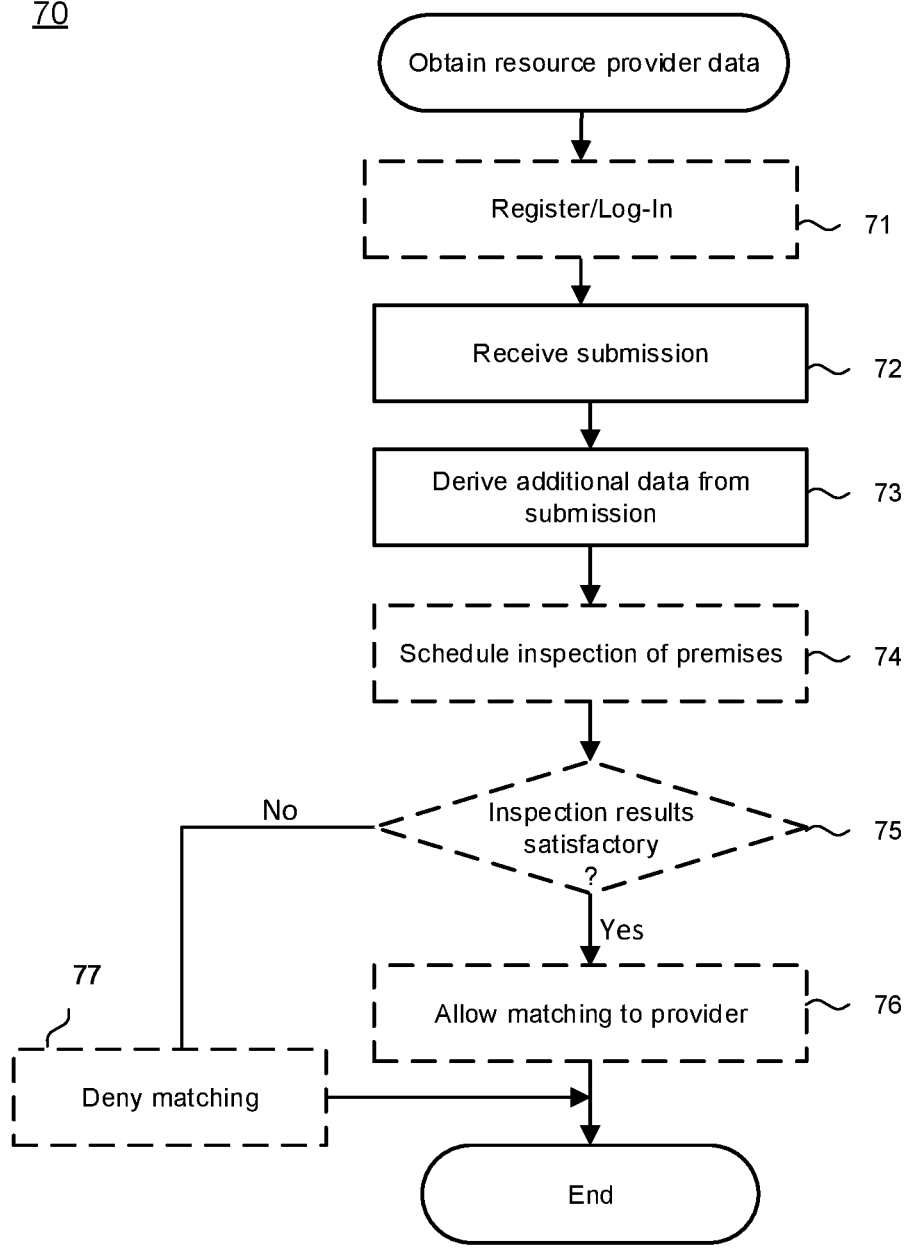
FIG. 3 is a flow diagram showing a routine for obtaining resource provider data for use in the method of FIG. 2 in accordance with one embodiment.

By offering their resources for allocation via the system 10, the resource providers commit not to offer them through other ways of distribution, allowing the storage 116 to keep up-to-date inventory of the available resources for combatting homelessness. If the resource providers, such as homeless shelters, receive walk-in individuals-at-need seeking their help, they can still provide help to that individual by guiding the individual in using the system 10 or otherwise reporting to the system 10 the allocation of the resource to the individual. FIG. 3 is a flow diagram showing a routine 70 for obtaining resource provider data for use in the method 50 of FIG. 2 in accordance with one embodiment. Optionally, if not already registered and logged-in with the virtual private cloud 11, an authentication of a user associated with a resource provided is performed with the virtual private cloud 11 by the authentication service 112, as described above (step 71). Such authentication may involve both registration and logging-in, or if the user is previously registered, just logging-in. A submission 22 from a computing device 42 associated with one of the resource providers is received by the resource matcher (via the UI frontend service 103) over one or more of the Internetworks (step 72). Additional data 17 is derived based on the submission by the AI classifier 135, as further described above (step 73). Optionally, if the resource being provided by the resource provider is secured beds or another resource that involves an individual-at-need spending significant time at the premises, the resource matcher 114 schedules an inspection of the premises of the resource provider, such as by offering a plurality of possible times for the inspection and receiving a reply via e-mail, through a web-page, or via a dedicated software application, and providing the scheduled time to a party performing the inspection, though other ways to schedule the inspection are also possible (step 74). If the results of the inspection data are satisfactory (step 75), the resource (or resources if multiple resources are dependent on the quality of the premises) is permitted to be matched to an individual-at-need by the resource finder 114 (step 76), ending the routine 70. If the results are not satisfactory (step 75), such as if the premises are found to fall below minimum habitability standards, the resource matcher 114 does not include the resource (or resources) offered by the resource provider that are dependent on the condition of the premises when determining matching resource providers for a particular individual (step 77), ending the routine 70.

Individuals-at-need receive an almost-instant way to determine which resources are available to them. FIG. 4 is a routine 80 for obtaining individual-at-need data for use in the method 50 of FIG. 2 in accordance with one embodiment. Optionally, if not already registered and logged-in with the virtual private cloud 11, an authentication of an individual-at-need as one of the users is performed with the virtual private cloud 11 by the authentication service 112, as described above (step 71). Such authentication may involve both registration and logging-in, or if the user is previously registered, just logging-in. The registration involves having the individual-at-need interact with one of the resource officers, either through the system 10 or in other ways (such as on the scene of a response of emergency services such as police or emergency medical services). A submission 25 is received from a computing device 31 associated with the individual-at-need over one or more of the Internetworks (step 82). Additional data 24 is derived by the AI classifier 135 based on the submission 25 (step 83). Optionally, if the individual-at-need's profile 30 does not include any notes that the individual has not used previously-requested resources (step 84), the individual is allowed to request the resources (step 88) (with the available resources being identified in step 54 described above), ending the routine 80. If the profile 30 includes notes that the individual has not used previously allocated resources (step 84), a notification is created for a user, such as an administrator, of the virtual private cloud 11 to review the individual-at-need's profile 30 (step 85). If the user grants approval (step 86), the routine moves to step 88 described above. If the user does not grant approval, the individual-at-need's request for resources is denied and the individual-at-need is notified by the resource matcher via one of the Internetworks 41 (step 87), ending the routine 80.

Figure 5:
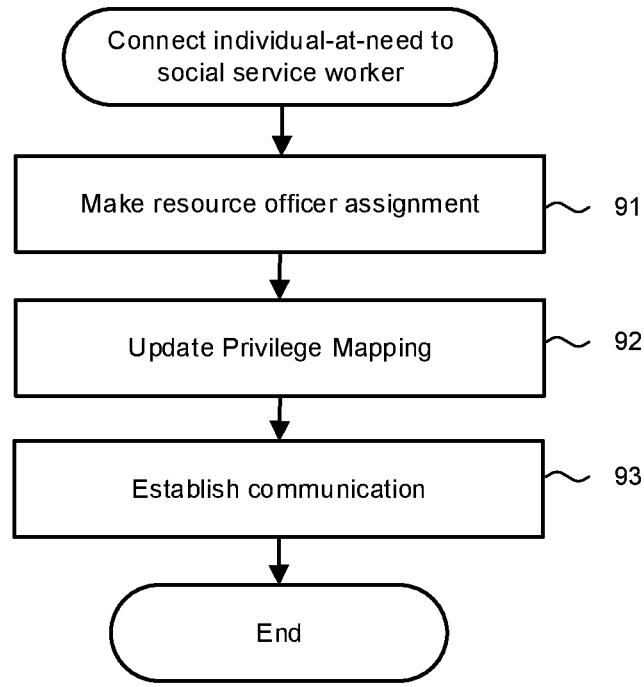
FIG. 5 is a flow diagram showing a routine for connecting individual-at-need to a resource officer for use in the method of FIG. 2 in accordance with one embodiment.

Connecting individuals-at-need and resource officers directly allows the resource officers to provide advice to the individuals in real time while the individuals are making their selections. FIG. 5 is a flow diagram showing a routine 90 for connecting individual-at-need to a resource officer for use in the method 50 of FIG. 2 in accordance with one embodiment. One of the resource officers currently logged-in into the virtual private cloud 11 are assigned to communicate with an individual-at-need (step 91), either automatically or based on a request from a resource officer, as described above with reference to FIG. 1. The privilege mapping of the assigned resource officer are updated to enable the officer to view data 24 of the individual-at-need with whom the officer is to chat (step 92). The chat session is established by the server 106 and maintained for the duration of the communication, with messages being forwarded between individuals-at-need and the resource officers via the chat frontend service (step 93), ending the routine 90. As described above with reference to FIG. 1, once the communication is established, the resource officers can engage in Diversionary Tactics to utilize resources already available to the individual-at-need to prevent homelessness.

While the invention has been particularly shown and described as referenced to the embodiments thereof, those skilled in the art will understand that the foregoing and other changes in form and detail may be made therein without departing from the spirit and scope.

What is claimed is:

1. A system for virtual cloud-based facilitation of homelessness reduction through secure, scalable, real-time need assessment and resource availability tracking and allocation, further comprising:
   at least one virtual private cloud implemented by one or more physical servers and one or more physical databases, the at least one virtual private cloud comprising:
   a resource data storage interfaced to a resource data application program interface (API) and configured to hold data associated with a plurality of providers of resources for homelessness reduction, the data comprising availability of resources at each of the providers, a geographic location of each of the resource providers, and a plurality of keywords associated with each of the resource providers, each of the keywords representing at least one of the resources provided by those of the resource providers and a trait-based restriction on providing one of the resources by that resource provider;

an account data storage interfaced to an authentication API and configured to hold account information for a plurality of users;

a plurality of subnets of the at least one virtual private cloud, each of the subnets comprising an individual-at-need data storage interfaced to an individual-at-need API and configured to store personal data associated with individuals-at-need, each individual-at-need residing at one of a plurality of localities, wherein each individual-at-need comprises one of a person at risk of homelessness and a homeless person, wherein the individuals-at-need associated with the personal data stored in one of the subnets reside in the locality different from the localities at which the individuals-at-need whose personal data is stored in the remaining subnets reside and wherein the personal data is stored in each of the subnets in accordance with laws of the locality associated with that subnet and comprises one or more of a plurality of traits associated with that individual-at-need;

a demilitarized zone only through which the at least one virtual private cloud interacts with computing devices external to the virtual private cloud, wherein the demilitarized zone is separated from other components of the at least one virtual private cloud by a firewall, the demilitarized zone comprising:
  a user interface front end service configured to receive one or more communications via one or more Internetworks from one of the computing devices that is associated with one of the individuals-at-need, one or more of the communications comprising one or more credentials associated with the one individual-at-need and data regarding the one individual-at-need, wherein the individual-at-need data comprises a geographical location of the individual-at-need that is in one of the localities and responses to one or more prompts for information, the responses comprising one or more of the traits associated with the one individual-at-need;
an authentication service configured to authenticate the one individual-at-need as one of the users using the credentials and the account information via the authentication API;
a virtual server cluster leveraging artificial intelligence comprising machine learning, the virtual server cluster comprising an artificial intelligence classifier configured to:
  perform using the machine learning an analysis of utilizations of the resources through a plurality of the resource providers by a plurality of the individuals-at-need based on one or more of the traits associated with the individuals-at-need and storing results of the analysis within a batch database within the virtual private cloud, the results comprising aggregated statistics regarding outcomes of the resource utilization by the individuals-at-need with particular ones of the traits;
  use the machine learning to derive one or more of the traits of the one individual-at-need from one or more of the communications;
a resource matcher interfaced to the virtual server cluster, the user interface front end service, and the authentication service and configured to:
  receive from the virtual server cluster the derived traits;
  store the received individual-at-need data and the derived one of the traits as part of the personal data within one of the subnets that is associated with the locality within which the one individual-at-need is located via the individual-at-need API comprised in the one subnet;
  process the received individual-at-need data to identify those of the resources needed by the one individual-at-need and a time frame when the resources are needed, and store the identification of the resources needed, the time frame, and the traits in the one subnet via the individual-at-need API comprised in the one subnet;
  receive from the virtual server cluster at least the portion of the aggregated statistics that is associated with those of the individuals-at-need who share at least some of the traits of the one individual-at-need;
  compare using the resource data API and the individual-at-need API comprised in the one subnet the geographical location, the keywords, and the availability of the resources associated with each of the resource providers to the geographic location of the individual-at-need, the resources needed by the individual-at-need, the time frame, and the one or more traits of the individual-at-need, and identify one or more of the resource providers matching the individual-at-need based on the comparison and based on the at least the portion of the aggregated statistics; and
  provide via the authentication service, the user interface front end service, and one or more of the Internetworks, to the computing device associated with the one individual-at-need a list of the matching resource providers;
the user interface front end service configured to provide one or more pop-up reminders to the computing device associated with the one individual-at-need, the pop-up reminders associated with making a selection of one of the resource providers on the matching resource provider list;
the resource matcher further configured to:
  receive via the user interface front end service the selection of one of the matching resource providers from the computing device associated with the one individual-at-need;
  generate information for accessing the one or more resources from the selected resource provider by the one individual-at-need and provide the generated information via the user interface front end service to the computing device associated with the one individual-at-need;
  update via the resource data API in the resource data storage the availability of the one or more resources associated with the generated information;

receive a notice that the one individual-at need has timely not accessed the one or more resources associated with the generated information, wherein the virtual cluster server updates the aggregated statistics based on the notice; and update availability of the one or more resources that have not been accessed by the one individual-at-need at the resource data storage via the resource data API;

the artificial intelligence classifier further configured to use the machine learning to update the aggregated statistics based on the notice.

2. A system according to claim 1, further comprising:
one or more chat servers interfaced to a chat front end comprised in the demilitarized zone and configured to:
establish real-time communication with one or more resource officers;
assign one of a plurality of resource officers available to provide advice in real-time to communicate with the one individual-at-need, following the authentication of the one individual-at-need as one of the users; and
establish the real-time communication between the individual-at-need and the selected resource officers, wherein the selection of the matching resource provider is made based on the communication and the pop-up reminders remind the one individual-at-need to follow-up with the selected resource officer.

3. A system according to claim 2, wherein the real-time communication is conducted via an encrypted protocol.

4. A system according to claim 2, wherein the chat servers are virtual chat servers and wherein a number of the chat servers deployed is scaled based on a number of the individuals-at-need seeking the real-time communication.

5. A system according to claim 2, wherein the chat servers are interfaced to a security service that analyzes the real-time communication between the one individual-at-need and takes action based on the analysis upon detecting a fraudulent activity within the real-time communication based on the analysis.

6. A system according to claim 2, the at least one virtual private cloud further comprising:
the artificial intelligence classifier configured to:
perform statistical analysis of the real-time communications and to store results of the analysis in a statistics database within the virtual private cloud, wherein the comparison is further based on at least a portion of the results of the statistical analysis; and
perform analysis of use by the one individuals-at-need of the resources for homelessness reduction and store results of the analysis within the statistics database.

7. A system according to claim 6, the at least one virtual private cloud further comprising:
the artificial intelligence classifier further configured to derive using the machine learning the keywords from the portion of the resource provider data received from the computing devices associated with the resource providers, wherein the classifier stores the traits and the resources in a real-time data database within the virtual private cloud.

8. A system according to claim 6, the at least one virtual private cloud further comprising:
public APIs comprised within the demilitarized zone and interfaced to big data API and configured to receive via one or more Internetworks requests for data within the statistics database from further computing devices outside the virtual private cloud and to retrieve the requested data from the statistics database via the big data API.

9. A system according to claim 1, wherein the personal data of one of the individuals-at-need is transferred from one of the subnets to another one of the subnets upon the individual-at-need moving from the locality associated with the one subnet to the locality associated with the another subnet.

10. A system according to claim 1, wherein a physical location of one or more the physical servers and physical databases implementing each of the subnets is associated with the locality in which the individuals-at-need whose personal data is stored in that subnet are located.

11. A system according to claim 1, wherein the account information for the plurality of users comprises privilege mapping that determines ability of the users to access information within the at least one virtual private cloud, the virtual private cloud further comprising:
a session management service interfaced to the authentication service and configured to receive requests for the information and to provide the information based on the privilege mapping.

12. A system according to claim 1, the virtual private further comprising:
an information prompt storage interfaced to the individual-at-need API and the resource matcher and configured to store the prompts for information.

13. A system according to claim 1, wherein each of the users are associated with a unique identifier and wherein the resource matcher uses only the unique identifier associated with the one individual-at-need to process the received individual-at-need data.

14. A system according to claim 1, wherein at least some of the resources comprise beds available on a particular time frame, wherein each of the beds is associated with an identifier comprising a physical address of a premises where that bed is located and the identifier is used to track the availability of the beds.

15. A system according to claim 1, the resource matcher further configured to send the via user interface front end service a request to the matching resource provider for a confirmation of an acceptance of the one individual-at-need to use one or more of the resources, wherein the access information is generated upon a receipt of the confirmation via one or more Internetworks.

16. A system according to claim 1, the resource matcher further configured to:
register one of the resource providers with the cloud-computing environment, comprising:
receive a submission from one of the computing devices that is associated with that resource provider comprising a portion of the resource provider data associated with that resource provider;
schedule a physical inspection of the premises of that resource provider;
upon receiving an acceptable result of the physical inspection, add the received portion of the resource provider data to the resource data storage via the resource data API.

17. A system according to claim 1, the resource matcher further configured to:
create a profile of the one individual-at-need and store the profile in the individual-need storage; and
create the note in the profile based on the received notice via the individual-at-need API.

18. A system according to claim 1, the resource matcher further configured to:
   receive from one or more of the computing devices that are associated with one or more of the resource providers a notice of a change in availability of one or more of the resources; and
   update in the resource data storage the availability of the one or more resources based on the received notice.

19. A system according to claim 1, wherein the at least one virtual private cloud is implemented using multiple geographic and cloud-availability zone.

* * * * *